June 12, 1962     A. B. SMITH     3,038,385
MACHINE TOOL FIXTURE SUPPORT
Filed Sept. 10, 1957
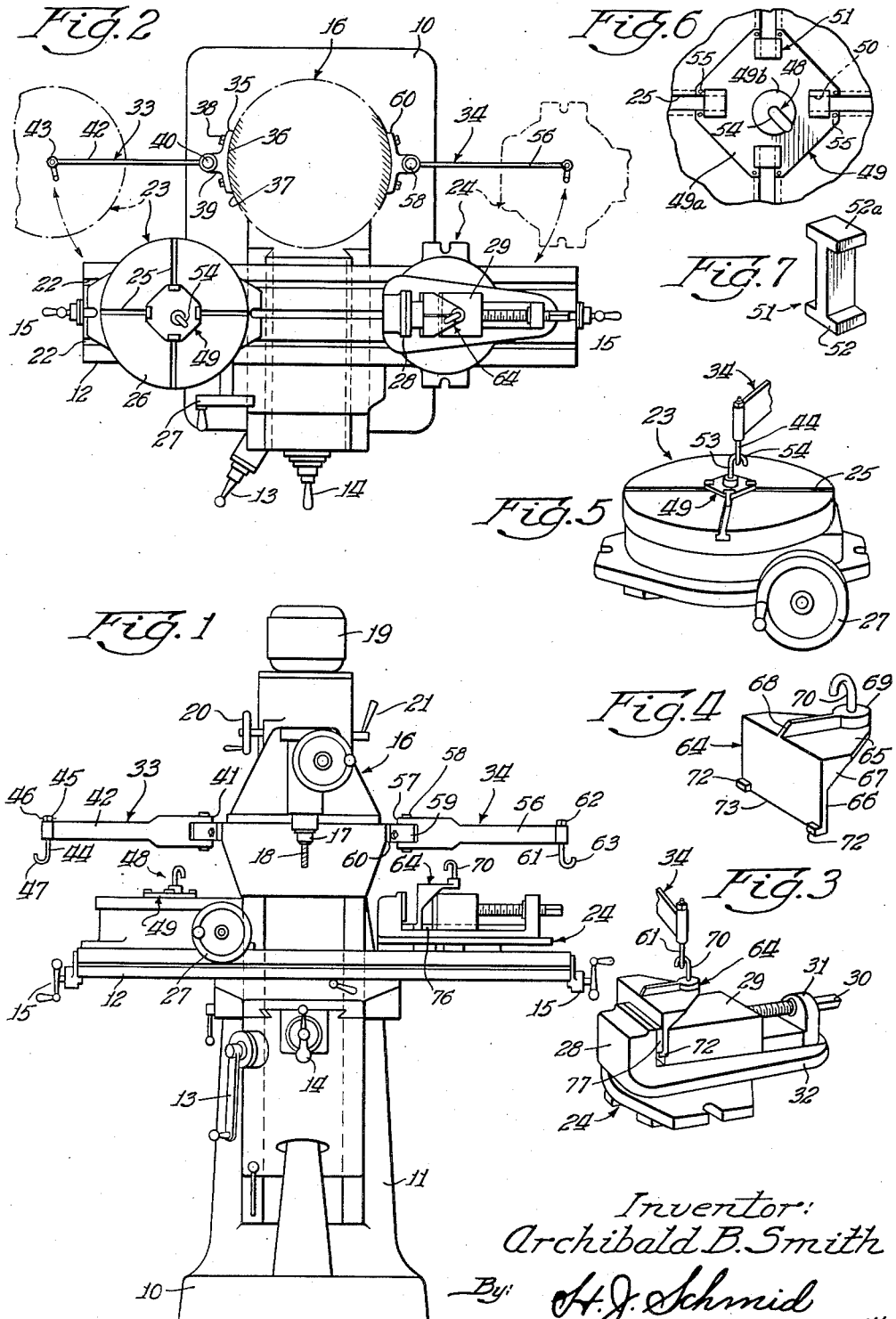
Inventor:
Archibald B. Smith
By: H. J. Schmid
Atty.

United States Patent Office 3,038,385
Patented June 12, 1962

3,038,385
MACHINE TOOL FIXTURE SUPPORT
Archibald B. Smith, 261 Elm St., Elmhurst, Ill.
Filed Sept. 10, 1957, Ser. No. 683,179
2 Claims. (Cl. 90—11)

This invention relates to supports for fixtures, such as vises, index tables, and like attachments for machine tool structures and adapted to be connected to the structures, and to move fixtures to and from an operative position on the structures.

An object of the invention is to provide a support for mounting attachments on a machine tool structure for movement from a stored position to an operative position on the structure.

Another object of the invention is to provide a machine tool attachment support construction by which the operator may readily and easily move an attachment to and from an operative position on the machine tool structure without physical effort of the operator to support the weight of the attachment.

Another object of the invention is to provide a support for pivotally mounting attachments to a machine tool structure to move and remove the attachments with respect to the machine tool structure by the operator.

A further object of the invention is to provide supports pivotally connected to a machine tool structure and adapted to be readily engaged and disengaged with fixtures usable with the structures and to move the fixtures to and from operative relation with the structures while securely holding the fixtures against accidental displacement and possible injury to the operator and damage to the fixtures and/or the machine tool structure.

A specific object of the invention is to provide supports for heavy work-positioning fixtures attachable to machine tool structures, the supports including arms having ends thereof pivotally mounted on the structures and swingable in horizontal planes to position universally movable fixture holders at other ends of the arms above a worktable and for engagement of the fixtures with the worktable.

A feature of the invention is to provide fixture holders of supports as described and wherein the holders are designed to balance the fixtures at the center of gravity thereof to prevent swaying movement thereof and possible displacement from the support arms.

With these and other objects in view, the invention consists of certain novel features of construction, as will be more fully described and particularly pointed out in the appended claims.

In the accompanying drawing:

FIG. 1 is a front elevation of a machine tool structure embodying two fixture supports, including arms pivotally mounted on the structure, and the holders of the supports being fixed to the fixtures operatively positioned on the worktable of the machine tool structure;

FIG. 2 is a top plan view of the machine tool structure, fixture supports and fixtures shown in FIG. 1;

FIG. 3 is an enlarged perspective view of the fixture holder and arm of one of the supports shown in FIGS. 1 and 2, the fixture holder of the support being engaged with the arm thereof and with the fixture;

FIG. 4 is a perspective view of the fixture holder shown in FIG. 3;

FIG. 5 is an enlarged perspective view of the fixture holder and arm of the other of the supports shown in FIGS. 1 and 2, the fixture holder of the support being engaged with the arm thereof and with the fixture;

FIG. 6 is a top view of the fixture holder of FIG. 5 illustrating its connection to the fixture; and FIG. 7 is a perspective view of one of the I-shaped members shown in FIGS. 5 and 6 and forming a portion of the fixture holder connected to the fixture.

The fixture supports of the present invention are adapted particularly for use in a milling machine illustrated in U.S. Patent 2,275,291, although it will be understood that the invention is not necessarily so limited. The milling machine, as shown in the patent and in FIGS. 1 and 2 of the drawings, comprises a base 10, a frame standard 11, and a worktable 12. The table 12 may be shifted to and held in various vertical positions by screw means operated by the handle 13 and may also be shifted backward and forward, toward and away from, the frame standard by screw means operated by the handle 14, and may also be shifted from side to side of the frame standard by screw means operated by either of the handles 15. The turrethead 16 is mounted upon the frame standard 11 in a way to swivel about a vertical axis to any rotative position through a full 360°. The turrethead may be held securely in each of a number of positions to which it may be turned on the frame standard, as is particularly pointed out in the above-identified U.S. patent. The turrethead is provided with a work-machining unit including a spindle 17 for holding any suitable machining tool 18, such as a drill, milling cutter, grinding wheel, or the like. The spindle 17 is powered for rotation by any suitable means as a motor 19 connected to the spindle by change-speed pulleys and by a power transmitting belt. A handwheel 20 is connected by suitable mechanism to the spindle 17 and said handwheel is adapted to rotate the turrethead to swing the axis of the machining tool 18 while the latter is machining the work, such as causing the tool 18 to generate an arcuate groove in the work. The tool spindle may be moved axially into cutting relation to the work in unison with corresponding axial travel of mechanism (not shown) by manual pressure on the tool-feeding handle 21 which operates a gear and rack on the tool-feeding mechanism. The milling machine described forms no part of the present invention, but is shown and described to disclose one type of machine tool structure to which the present invention is particularly, but not necessarily, applicable. Further details of the structure and operation of the milling machine shown and described may be obtained from the more complete disclosure of U.S. Patent 2,275,-791.

The top of the worktable 12 is shown as being provided with a plurality of slots 22 extending from one end to the other of the worktable for receiving the rails on the fixtures or attachments 23 and 24, the fixture or attachment 23 being in the form of an index table which may be bolted to the worktable when in use. The fixture attachment 24 is illustrated as a vise which may be also bolted to the worktable in conventional manner. The index table 23 and the vise 24 are of conventional form and, therefore, will be described only briefly. The index table is provided with a plurality of intersecting T-shaped slots 25 formed in the head 26 thereof which may be rotated to any degree desired by a wheel 27 through suitable mechanism (not shown). The vise 24 is provided with the stationary jaw 28 and with the movable jaw 29, the jaw 29 being moved by rotation of a screw 30 rotatably secured to the jaw 29 and threaded into an upstanding flange 31 secured to and forming a part of the fixed base 32.

In the use of attachments or fixtures, such as the index table 23 and vise 24, for machine tool structures, such as the milling machine illustrated and like machines, it is frequently necessary that the attachments be removed from working position on the milling machine and transported to a tool room or other suitable storage space which may be some distance from the machine. These attachments are quite heavy: For example, the vise illustrated in the drawings may weigh 100 pounds, and the index table 23 may weigh approximately 200 pounds. Accordingly, lifting and moving the attachments from the worktable of the milling machine to storage by the operator may cause a great deal of physical effort of the operator, and expenditure of considerable time by the operator, and this is equally true when it is necessary to obtain the fixture from storage and to lift and to position the fixture upon the worktable of the milling machine. In addition, the design and weight of the fixtures makes them quite difficult to handle and frequently results in damage to the fixtures by the operator dropping the fixtures during transportation, with possible injury to the operator and also to the fixture.

The present invention is directed to the provision of supports for fixtures, such as vises, index tables and like attachments for machine tool structures and adapted to be connected to the structures to move the fixtures from and to operative positions on the structures in a convenient and ready manner, and without the possibility of harmful injury to the operator or damage to the fixtures, and requiring only a minimum of effort of the operator to move the fixtures between operative and storage positions with respect to the machine tool structure. More particularly, the fixture supports are identified at 33 and 34 in the different views of the drawings. The fixture support 33 comprises an arc-shaped bracket 35 having a surface 36 formed to be complementary to the arc-shaped surface 37 exteriorly of the turrethead 16 and held in engagement therewith by bolts 38 extending through openings in the bracket 36 and inserted within threaded openings formed in the turrethead 16. The bracket 35 is formed with a centrally located cylindrical boss 39 having an opening for reception of a headed pin 40 extending therethrough and also openings in the bifurcated end 41 of arm 42 to pivotally connect the arm 42 to the turrethead 16. The outer end of the arm 42 is provided with a cylindrical bearing 43 having the bore thereof receiving a pin 44 of J-shape, the upper end of the pin 44 being threaded to receive a nut 45 having openings therein aligned with an opening in the threaded portion of the pin 44 for receiving a cotter pin 46 to prevent unwanted rotation of the nut 45 with relation to the pin 44. The pin 44 is provided at its lower end with a hook-shaped portion 47 for receiving a similarly shaped portion on the holder, generally indicated at 48, forming a portion of the fixture support 33 as will be described. The fixture holder 48 further comprises the holder 48 in the form of a plate 49a square in configuration, as shown in FIGS. 6 and 7, and provided with notches 50 located in the corners thereof and disposed substantially 90° from each other for receiving I-shaped blocks 51, the base 52 of the blocks being received within the T-shaped slots 25 in the rotating head 26 of the index table 23 as shown in FIGS. 5 and 6. The plate 49 is provided with an upstanding cylindrical boss 49b having threaded engagement with a pin 53 having its upper end in the form of a hook 54 to engage the hook 47 of the pin 44 on the arm 33 as shown in FIG. 5 and which serves to suspend the index table 23 above the worktable 12 of the milling machine for movement to and from the worktable, or to hold the table 23 in its storage position upon pivotal movement of the arm 33 as shown in dotted lines in FIG. 2. It will be noted that the wheel 27 of the index table 23 would cause unbalance and tilting movement of the index table 23 if the table were suspended from the arm 33 at the axis of the circular index table due to the weight of the wheel 27 being located at one side of the axis of the index table. To properly balance the index table 23 on the arm 33 during movement to and from the worktable 12 and when in its storage position, the cylindrical boss 49b on the plate 49 is eccentrically located with respect to the center of the plate 49 to counter this condition, so that, when the index table 23 is suspended from the arm 42, the hook 54 will be located at the center of gravity of the index table 23 to prevent any possibility of tilting action of the index table 23 resulting in accidental or inadvertent detachment from the arm 42 during movement of the index table 23 to and from an operative position on the index table 12 of the milling machine. A further feature is the provision of upstanding lugs 55 provided at opposite sides of each slot on the upper face of the plate 49 adapted to prevent movement of the I-blocks 51 outwardly in the slots 50 in the plate 49 and detachment from the plate 49, thus insuring that the index table 23 will be prevented from disengagement with the plate 49 by movement of the blocks 51 interconnecting the plate 49 with the index table 23. The I-blocks 51 are of sufficient length to insure that the base 52 will be maintained in the slots 25 of the index table 23 and that the heads 52a of the I-blocks will be held within the slots 50 of the plate 49 at all times during the connection of the index table 23 to the plate 49 and during transport of the index table 23 from its position on the worktable as shown in FIGS. 1 and 2 to the storage position shown in dotted lines in FIG. 2. It will be apparent that when the weight of the index table 23 is transmitted by the blocks 51 and plate 49 to the arm 42 that the heads 52a of the I-blocks will be unable to move outwardly due to the lugs 55 restraining such movement of the I-blocks.

Referring now to FIGS. 1, 2, 3, and 4, and more particularly, to the support 34—the arm 56 thereof is similar to the arm 42 and has a similar pivotal connection to the turrethead 16 of the milling machine, the bifurcated end 57 of the arm 56 being pivotally connected to a cylindrical boss 59 of a bracket 60 bolted to the exterior surface of the turrethead. The outer end of the arm is provided with a pin 61 having a screw-threaded upper portion extending through a cylindrically shaped outer end of the arm 56 with a nut 62 being threaded into engagement with the pin 61. The pin 61 has a hook-shaped lower portion 63 projecting downwardly from the arm 56 as clearly shown in FIGS. 1 and 3. The pin 61, similarly to the pin 44, may rotate within the cylindrical outer end of the arm 56. The support 34 further comprises a substantially L-shaped holder or block 64, the horizontal portion 65 and the depending vertical portion 66 being provided with strengthening ribs 67, and the horizontal portion 65 also being provided with an upwardly extending strengthening rib 68 terminating at one end into a cylindrical boss 69 having a pin 70 extending therethrough, the upper end of the pin 70 having a threaded connection with the boss 69 to firmly secure the pin 70 to the L-shaped block 64. The downwardly extending portion 66 of the block 64 is adapted to be positioned between the jaws 28 and 29 of the vise so that, upon rotative movement of the screw 30, the movable jaw 29 will firmly grip the depending portion 66 of the block 64 between the jaws of the vise as clearly shown in FIG. 3. It will be noted from a consideration of FIG. 4 that the bottom edge of the depending portion 66 of the block 64 is provided at opposite ends thereof with laterally extending lugs 72 defining a slot 73 in the bottom edge of the depending portion of the block 64 and adapted to receive the slide 76 of the machine tool 18 as shown in FIG. 1 to prevent movement of the vise longitudinally of the vertical portion 66 of the block 64 when the vise is suspended from the arm 34 as shown in FIG. 3. The laterally extending lugs 72 on the depending portion 66 of the block 64 are adapted to being received under and beneath the plate 77 fixed to the stationary jaw 28 of the vise and to firmly engage the plate 77 of the vise to prevent any possibility of the vise moving relative to the block 64 when the vise is suspended from the arm 56 of the support 34. It will be apparent that the aforesaid construction of the block is such that, when the jaws of the vise are engaged with the block 64 as shown in FIG. 3, the jaws of the vise firmly grip the block 64 and co-operate with the block 64 so that there will be no possibility of the heavy vise slipping from the holder block 64 of the support during movement to and from the worktable 12 of the milling machine with respect to its storage position shown in dotted lines in FIG. 2. The block 64 has been purposely designed as shown and described so that the pin 70 will be located at the center of gravity of the vise 24 to prevent tilting movement of the vise and to thus insure that the hook-shaped portions of the pins 61 and 70 are retained in engagement and safely suspend the vise from the arm 56 during movement of the vise between its worktable and storage positions.

In operation, and assuming that the index table 23 and vise 24 are on the worktable as shown in FIGS. 1 and 2 with the jaws of the vise closed to firmly grip the L-shaped member 64, and that the arms 42 and 56 are swung over the worktable 12 to position the hook-shaped portions of the pins 44 and 51 underlying the hook portions of the pins 53 and 70, the handle 13 of the milling machine is rotated in a direction to effect lowering of the worktable 12 so that the adjacent hook portions of the pins are engaged and the index table 23 and vise 24 suspended from the arms 42 and 56 respectively. With the index table 23 and vise 24 being thus freely suspended above the worktable 12 of the milling machine, the arms 42 and 56 can be rotated about their pivot points at the pins 40 and 58 to swing the index table 23 and vise 24 to the stored positions shown in dotted lines in FIG. 2. It will be apparent that if either one or the other of the two fixtures or attachments 23 and 24 are desired to be used, they may be readily moved from their stored positions to positions over the worktable 12 which can be raised by rotation by the handle 13 to position the fixtures on the worktable with the keys on the bottom of the fixtures in position within the slots 22 on the worktable. It will be apparent that, as the holders 49 and 64 of the supports balance the index table and the vise at the respective centers of gravity thereof to prevent tilting thereof, when the table 12 is moved in a vertical direction by rotation of the handle 13, the keys in the fixtures may be readily engaged with the slots 22 in the worktable 12 and without bumping edge portions of the fixtures against the worktable and possible damage to the fixtures and to the worktable.

From the foregoing description taken with the drawings, it will be apparent that I have provided supports for fixtures or attachments of machine tool structures which are effective to permit the ready and easy movement of the fixtures from and to the worktable without any manual effort upon the part of the operator, as the operator need merely place the holders of the supports in connected relation to the fixtures and the hook-shaped portions of the pins on the arms and on the holders in such relation with each other that, upon lowering of the worktable 12, the hook-shaped portions of the pins will engage and the fixtures will be suspended from the arms of the supports which may be readily moved to place the fixtures in stored positions from the worktable and to remain in stored positions until use of the fixtures is again desired when one or the other of the arms 42 or 56 with the attached fixture may be moved to position the fixture over the worktable in a position to engage the keys on the fixtures with the slots 22 in the worktable by rotation of the handle 13 to raise the worktable 12. It will be apparent that, upon raising of the worktable 12, the hook-shaped portions of the arms can be readily disengaged from the hook-shaped portions of the holders by elevation of the worktable 12 to a position to permit the disengagement of the hook-shaped portions of the arms and holders. The plate 49 may be readily removed from the fixture by movement of the I-shaped blocks 51 in an outward direction relative to the slots in the plate 49 and then through the key slots 25 in the index table 23. The L-shaped member 64 is also readily engaged and disengaged with the vise 24 by rotation of the screw 30 of the vise to either engage or disengage the holder 64.

I wish it to be understood that my invention is not to be limited to the two specific embodiments shown and described, except only insofar as the claims may be so limited, as it will be apparent to those skilled in the art that changes may be made without departing from the principles of the invention.

I claim:

1. A vise support for a machine tool structure having an upright rigid stand provided with a vertically movable worktable having parallel slots in a vise-engaging horizontal surface thereof, said worktable being adapted to removably position the vise thereon with rails on a horizontal bottom surface of the vise disposed in the worktable slots, said support comprising an arm pivoted at one end to said stand for movement in a horizontal plane to position the other end thereof away from said worktable and to a position over said worktable; means rotatably mounted on the free end of said arm; a holder for said vise and including a member having a depending portion of plate-like construction adapted to be clamped between the jaws of the vise and having its lower portion provided with laterally extending lugs disposed beneath and engaging one of the jaws of the vise; and means connecting said holder member to the rotatably mounted means on the free end of said arm and adapted to be disposed at the center of gravity of the vise to position the bottom surface of the vise in a horizontal plane parallel to the horizontal plane of the worktable surface, and releasing said holder from said arm upon horizontal movement of said arm and holder from a storage position away from the worktable to a position over the worktable and rotary movement of the vise to align the rails thereof with the worktable slots and vertical movement of the worktable and engagement thereof with the rails of the vise in the worktable slots.

2. A vise support for a machine tool structure having an upright rigid stand provided with a vertically movable worktable having parallel slots in a vise-engaging horizontal surface thereof, said worktable being adapted to removably position the vise thereon with rails on a horizontal bottom surface of the vise disposed in the worktable slots, said support comprising an arm pivoted at one end to said stand for movement in a horizontal plane to position the other end thereof away from said worktable and to a position over said worktable; means rotatably mounted on the free end of said arm; a holder for said vise and including a member having a depending portion of plate-like construction adapted to be clamped between the jaws of the vise and having its lower portion provided with spaced lugs defining a slot for positioning a portion of the vise therebetween to prevent lateral movement thereof, and said lugs extending laterally of said depending portion beneath and engaging one of the jaws of the vise; and means connecting said holder member to the rotatably mounted means on the free end of said arm and adapted to be disposed at the center of gravity of the vise to position the bottom surface of the vise in a horizontal plane parallel to the horizontal plane of the worktable surface, and releasing said holder from said arm upon horizontal movement of said arm and holder from a storage position away from the worktable to a position over the worktable and rotary movement of the vise to align the rails thereof with the worktable slots and vertical movement of the worktable and engagement thereof with the rails of the vise in the worktable slots.

References Cited in the file of this patent
UNITED STATES PATENTS
437,486    Driesbach _____ Sept. 30, 1890
(Other references on following page)

UNITED STATES PATENTS

| | | |
|---|---|---|
| 1,820,667 | Leyes | Aug. 25, 1931 |
| 1,931,640 | Baumbach | Oct. 24, 1933 |
| 2,055,783 | Bennett | Sept. 29, 1936 |
| 2,314,792 | Korner | Mar. 23, 1943 |
| 2,315,393 | Bowerman | Mar. 30, 1943 |
| 2,490,583 | Dunkelberger | Dec. 6, 1949 |
| 2,700,568 | Meili | Jan. 25, 1955 |

FOREIGN PATENTS

| | | |
|---|---|---|
| 1,056,725 | France | Oct. 21, 1953 |
| 1,109,079 | France | Sept. 21, 1955 |

OTHER REFERENCES

"Unique Method of Storing Lathe Chucks," article in Machinery Magazine published March 1945 (page 202 relied on).